United States Patent [19]

Toegel et al.

[11] Patent Number: 5,031,094
[45] Date of Patent: Jul. 9, 1991

[54] SWITCH CONTROLLER

[75] Inventors: Herbert J. Toegel, Middlebury; Joseph R. Yudichak, Madison, both of Conn.

[73] Assignee: Alcatel USA Corp., New York, N.Y.

[21] Appl. No.: 682,030

[22] Filed: Dec. 14, 1984

[51] Int. Cl.$^5$ ............................................. G06T 13/36
[52] U.S. Cl. ................................ 364/200; 364/260.1; 364/238.1
[58] Field of Search ... 364/200 MS File, 900 MS File; 340/825.03, 825.04, 825.5, 825.79, 825.06, 825.18; 370/94, 60

[56] References Cited

U.S. PATENT DOCUMENTS

| | | | |
|---|---|---|---|
| 3,557,315 | 1/1971 | Kobus et al. | |
| 3,609,688 | 9/1971 | Dupleux et al. | |
| 3,730,974 | 5/1973 | Verschueren | |
| 3,890,469 | 6/1975 | Kelly et al. | 370/60 |
| 3,979,733 | 9/1976 | Fraser | 370/60 |
| 3,995,256 | 11/1976 | Barlow | 371/34 |
| 4,058,672 | 11/1977 | Crager et al. | 370/60 |
| 4,207,437 | 6/1980 | Janssens | |
| 4,271,506 | 6/1981 | Broc et al. | 370/60 |
| 4,399,531 | 8/1983 | Crande et al. | 370/60 |
| 4,442,502 | 4/1984 | Friend et al. | 364/900 |
| 4,628,446 | 12/1986 | Hoffner | 364/900 |
| 4,651,318 | 11/1984 | Lurderer | 370/60 |
| 4,661,947 | 9/1984 | Lea | 370/60 |
| 4,692,917 | 9/1987 | Fujioka | 370/60 |

FOREIGN PATENT DOCUMENTS

| | | |
|---|---|---|
| 517419 | of 0000 | China . |
| 0034905 | of 0000 | European Pat. Off. . |
| 151337 | of 0000 | New Zealand . |
| 159130 | of 0000 | New Zealand . |
| 162960 | of 0000 | New Zealand . |
| 169991 | of 0000 | New Zealand . |
| 196276 | of 0000 | New Zealand . |

OTHER PUBLICATIONS

Microboo Port Selector User's Manual, Micom May 1982.
IBM Technical Disclosure Bulletin, vol. 16, No. 12, May 1974, pp. 3899–3901.
Commutation & Electronique, No. 25, Apr. 1969, pp. 24–38.
International Switching Symposium Paper 431-2, pp. 1–8.
International Switching Symposium Paper 20B6, pp. 267–274.
Sixth Euromicro Symposium on Microprocessing and Microprogramming, pp. 322–327.
The Bell System Technical Journal, vol. 55, No. 2, Feb. 1976, pp. 183–232.

*Primary Examiner*—David Y. Eng
*Attorney, Agent, or Firm*—Peter C. Van Der Sluys

[57] ABSTRACT

A switch controller for a dynamic switch responds to command from a using system to provide control signals to the dynamic switch which causes the switch to establish and breakdown paths between sources and destinations in the using system. The controller includes a plurality of command registers which are temporarily assigned to a command source for receiving command signals, decoding said signals and providing control signals to the switch for establishing or breaking down a switch path. The controller may if desired provide an echo to a selected destination so that proper execution of commands may be ascertained. After the commands are completed the control register is released for reassignment to another command source while an established switch path remains intact. Thus, commands may be received from any source for controlling the switch.

9 Claims, 8 Drawing Sheets

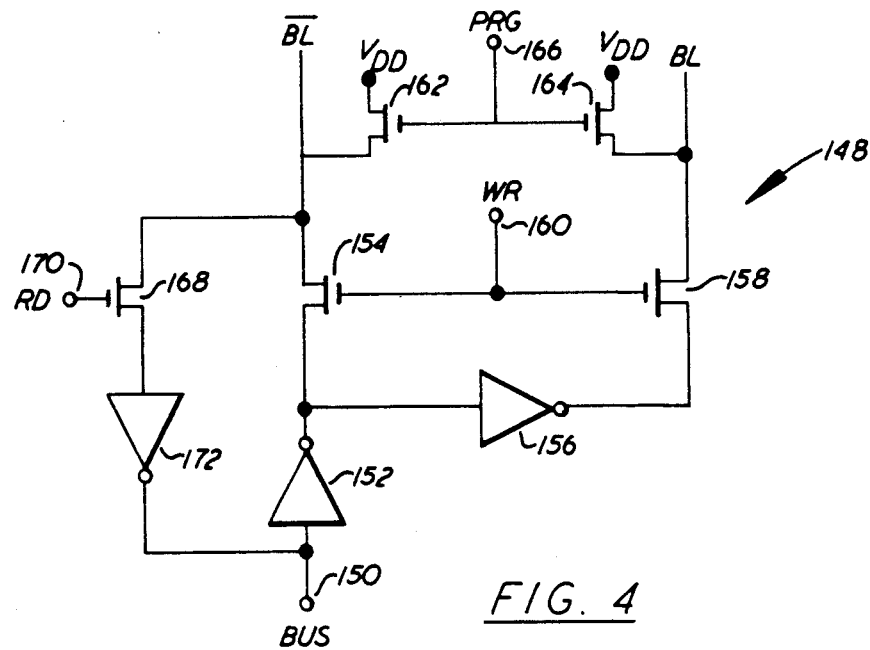
FIG. 4
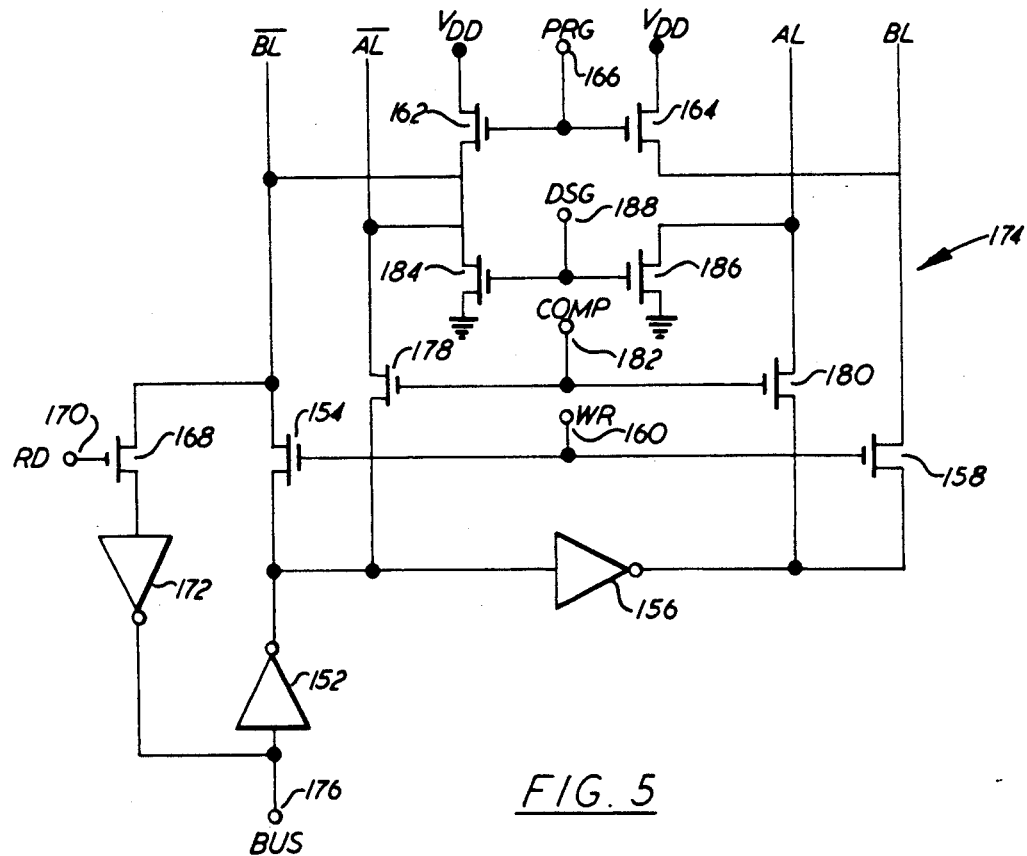
FIG. 5
```
FEDC  BA98  7654  3210
xxii  iiii  dddd  dddd
```
FIG. 6

COMMAND REG. TIMING

SWITCH CONTROLLER

CROSS-REFERENCE TO RELATED APPLICATIONS

This application is related to the following U.S. patent application: Ser. Nos. 682,033; 682,034; 682,035; 682,228; 682,038 all filed on even date herewith; and Ser. No. 722,894 filed on Apr. 12, 1985. All of the above applications are assigned to the assignee hereof.

BACKGROUND OF THE INVENTION

1. Field of the Invention

The present invention relates to a switch controller and more particularly to a controller that functions as a command processor that responds to commands to dynamically assign switch paths to sources and destinations in a switch of the type described in U.S. patent application Ser. No. 682,033, entitled "APPARATUS AND METHOD FOR PROVIDING DYNAMICALLY ASSIGNED SWITCH PATHS" U.S. Pat. No. 4,656,626 filed on evendate herewith and assigned to the assignee of this application.

2. Description of the Prior Art

In modern communication and data systems there is a need to rapidly and efficiently convey information between various points in the system. Such systems could be for communicating voice, data or any other type of information between a plurality of points which are often referred to as ports in certain arts. Most such systems require the use of the switch to selectively connect the various ports of a system. Modern systems must have the ability to dynamically establish and breakdown switch paths between a plurality of ports in response to system needs and commands.

In systems using PCM and TDM techniques the switching between ports may involve both spacial switching from port to port and time switching between timed channels of one or more ports. As an example in a system having 8 ports each with 32 channels there are 256 sources and destinations that could require the dynamic assignment of switch paths.

Heretofor, a switch path would be provided for every source with one particular source being reserved exclusively for transmitting commands. Once a path had been assigned to a source further assignment of the path would be blocked. Thus, only a reserved source could be used for commands to set up paths for other sources. When it was required to set up paths for two sources the required commands would be delayed since the single reserved source could only convey a certain amount of information and the second command would have to be queued up for subsequent transmission.

Thus, there was a need in the prior art for a switch controller having a command processor that could process commands received from any source for establishing paths between any two sources even for establishing paths between the command source and another source for conveying subsequent information received on the command source.

SUMMARY OF THE INVENTION

Particular needs for such dynamic switches and switch controllers are described in U.S. patent application Ser. No. 682,228, entitled "APPARATUS FOR ESTABLISHING COMMUNICATION PATHS" U.S. Pat. No. 4,639,910 and U.S. patent application Ser. No. 682,038, entitled "COMMUNICATION SYSTEM", now U.S. Pat. No. 4,638,474 both applications filed on evendate herewith. A dynamic switch is described in U.S. patent application Ser. No. 682,033, entitled "APPARATUS AND METHOD FOR PROVIDING DYNAMICALLY ASSIGNED SWITCH PATHS" now U.S. Pat. No. 4,656,626 filed on evendate herewith. The above three mentioned U.S. patent applications are incorporated herein by reference.

The dynamic switch mentioned above is achieved through the unique use of a CAM/RAM/CAM memory array to dynamically provide space and time switching between a plurality of sources and destinations. The memory array includes a source CAM portion, a destination CAM portion and a data RAM portion with each row forming a word. In order to establish a path, a source address is stored in the source CAM portion of a word and a destination address is stored in the destination CAM portion of the same word.

When data is to be switched the address of the data source is presented to the source CAM on a TDM source address bus to address a word stored in the array having the same source address. The data is then written into the RAM portion of the addressed word from a data bus, if a source address comparison is found. The address of the data destination is time division multiplexed to the destination CAM via a destination address bus. If the address of the data destination on the destination address bus matches a stored destination address, the data RAM associated with the address is enabled and data is read to the data bus for delivery to the data destination. Means are further provided to assign and unassign addresses to and from words in the memory array to thereby dynamically establish switch paths.

The present invention provides a switch controller for the previously described dynamic switch which controller includes a command processor that is responsive to commands received from a using system to provide control signals to the dynamic switch thereby allowing the switch to establish and breakdown paths between any of the sources and destinations in the system and to provide a loopback to a source.

The invention uniquely allows commands to be received from any source for assigning or unassigning a switch path. The commands are interpreted and control signals are provided to the dynamic switch for establishing the paths designated by the commands. Thus, particular sources need not be designated and reserved as command sources. More particularly, the sources and destinations may be timed channels of a port as in TDM applications. This greatly increases the number of sources and destinations that can be accomodated.

This controller is essentially a command processor that comprises a memory array having a plurality of rows, as for example five, each comprising CAM and RAM portions for storing command codes, data and addresses. Each row forms a separate command register.

A command register may be assigned to a source (port and channel) upon receipt of a particular coded request arriving from the source. Because of this dynamic assignment, any of the sources capable of providing the particular code can become a command source for establishing paths. Thereafter whenever the particular source assigned to a command register appears on a data bus, the data from the source is loaded into the command register which has been assigned to the source. The data loaded into the command register is decoded to provide control signals for the switch controller and the dynamic switch. This process is continued until the commands necessary to establish or breakdown a path or perform a desired function are completed at which time another coded request is transmitted from the command source which causes the command register to be unassigned. The command register may then be used by another source needing a command register. In the meantime, the path has been established in the dynamic switch and data may be transferred until the path is to be broken down. At which time a new command source will be established and a new set of commands transmitted to a command register to provide the control signals for breaking down a previously established path.

Thus, any source capable of sending the particular coded request can become a command source for providing commands to establish a path for another source or for itself. As long as a source is available, commands may be transmitted from the source to the switch controller, which will respond to the commands to set up a path which path may include the source itself.

In cases where it is desirable to monitor the commands that have been executed, an echo path may be established for sending completed commands to a monitoring destination.

It is an object of the invention to provide a controller for a dynamic switch wherein control commands may be received from any source for establishing a communication path between another source and destination or between itself and a destination.

It is a further object of the invention to provide a switch controller that has the capability for sending completed commands to a monitoring destination.

It is a further object of the invention to provide a switch controller having a command processor including a plurality of command registers to which command sources are temporarily assigned while commands are being processed to establish a switch path after which the command register is released and the switch path remains intact.

It is a further object of the invention to provide a switch controller that may simultaneously accept and process a plurality of commands received from any of the system sources that transmit a unique coded request to become a command source.

Other objects and advantages will become apparent to those skilled in the art from the following detailed description read in conjunction with the appended claims and the drawings attached hereto.

BRIEF DESCRIPTION OF THE DRAWINGS

FIG. 4 is a schematic diagram of a read/write logic circuit that may be used with a RAM cell as shown in FIG. 2.

FIG. 5 is a schematic diagram of a read/write logic circuit that may be used with a CAM cell as shown in FIG. 3.

FIG. 6 shows the general form of a data word structure that may used with the present invention.

DETAILED DESCRIPTION OF THE INVENTION

Figure 1:
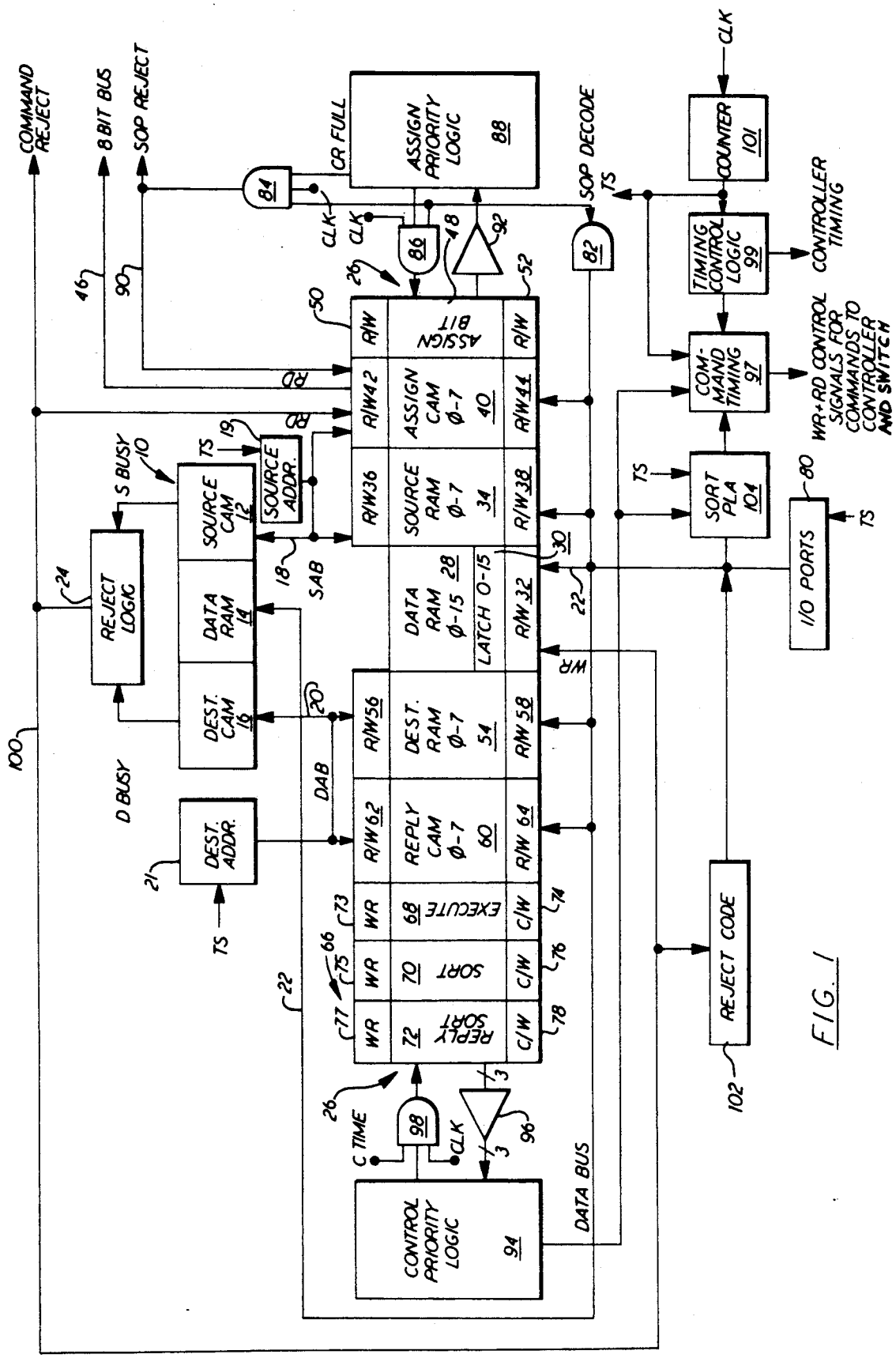
FIG. 1 is a functional block diagram of the switch controller of the present invention shown in an intended environment.

FIG. 1 is a functional block diagram of a switch controller constructed in accordance with the present invention and shown in an intended environment. The switch controller may be used in conjunction with a switch 10 as disclosed in U.S. patent application Ser. No. 682,033, entitled, "APPARATUS AND METHOD FOR PROVIDING DYNAMICALLY ASSIGNED SWITCH PATHS" now U.S. Pat. No. 4,656,626, which is incorporated herein by reference. The switch 10 comprises a CAM/RAM/CAM memory array including a source CAM 12, a data RAM 14 and a destination CAM 16. The source CAM 12 is connected to a source address bus 18 for receiving and transmitting source addresses. The destination CAM 16 is connected to a destination address bus 20 for receiving and transmitting destination addresses. The data RAM 14 is connected to a TDM data bus 22.

Figure 9:
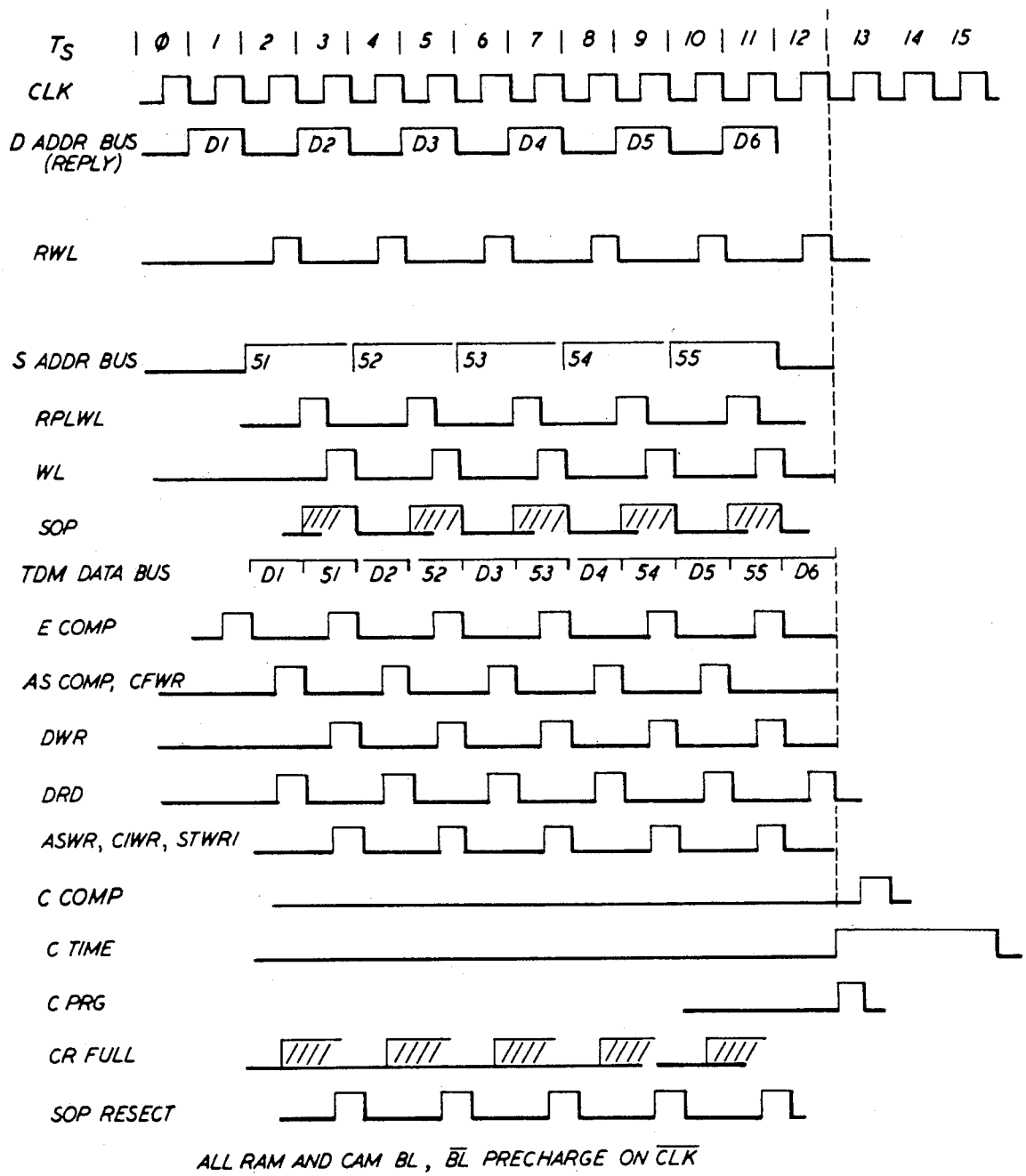
FIGS. 9 through 11 are timing signal charts for various modes of operation of the present invention.

A source address circuit 19 receives time slot signals from a counter 101 and provides source addresses to the source address bus 18 during selected time slots. A destination address circuit 21 receives time slot signals from a counter 101 and provides destination addresses to the destination address bus 20 during selected time slots. The timing of the addresses on the address busses is coordinated with a TDM data bus and its connection to the sources and destinations as shown in FIG. 9. The source and destination address circuits contain counters for generating the addresses.

The CAM/RAM/CAM memory array of switch 10 may have any number of word lines as for example, 72 words as used in a preferred embodiment. As described in the previously mentioned patent application, the source CAM 12 has an output S BUSY which provides an indication such as a logic level 0 when an address appearing at the source address bus 18 is compared with the stored addresses and is found not to be stored in the source CAM 12. Similarly, the destination CAM provides an output D BUSY at a logic level 0 when an address appearing at the destination address bus 20 is compared with the stored addresses and is found not to be stored in the destination CAM 16. Thus, if a command requires the data RAM to either be written to or read from a particular source or destination address and the address is not found in the source or destination CAMs, either the S BUSY or D BUSY outputs will be at a logic level 0. A reject logic circuit 24 in response to a logic level 0 signal at either S BUSY or D BUSY will provide an output on line 100 at a logic level 1 which is indicative of a command rejection.

The heart of the switch controller comprises a command processor having a memory array forming a number of command registers 26. Each command register being formed in a row and comprising a plurality of CAM and RAM portions. In the embodiment to be described, there will be five command registers 26, however only the circuitry for one command register will be shown. A data RAM portion 28 is provided for each command register, each portion comprises 16 RAM cells for storing 16 bits of data. The data RAM portion 28 has associated therewith a latch portion 30. Each data RAM cell is connected to a latch. A read/write logic 32 is associated with all the data RAM portions of the command registers. Data may be written from or read to the TDM data bus 22 through the read/write logic 32.

A source RAM portion 34 is provided for each command register and comprises eight RAM cells for storing source addresses. The source RAM portions 34 of the command registers have associated with them read/write logic 36 and 38. Read/write logic 36 is connected to the source address bus 18 for writing and reading addresses from and to the address bus. Read/write logic 38 is connected to the TDM data bus 22 for writing and reading data from and to the data bus.

An assign CAM portion 40 is provided for each command register and includes eight CAM cells. The assign CAM portions 40 have associated therewith read/write logic 42 and 44. Read/write logic 42 is connected to the source address bus 18 for writing and reading addresses from and to the bus. Read/write logic 42 is also connected to an eight bit bus 46 for writing to the bus 46 an address presented to the assign CAM portion 40 whenever the command reject signal is presented to the read/write logic 42. Thus, the command reject signal is provided to the read/write logic 42 as a read signal. Read/write logic 44 is connected to the TDM data bus 22.

An assign bit 48 is provided for each command register and is a single CAM cell. Read/write circuits 50 and 52 are assocted with the assign bits.

A destination RAM portion 54 comprising eight RAM cells is provided for each command register. The destination RAM portions have associated therewith read/write logic 56 and 58. Read/write logic 56 is connected to the destination address bus 20 while read/write logic 58 is connected to the TDM data bus 52.

A reply CAM portion 60 is provided for each command register and has eight CAM cells. The reply CAM portions have associated therewith read/write logic 62 and 64. Read/write logic 62 is connected to the destination address bus 20 while the read/write logic 64 is connected to the TDM data bus 22.

Finally, each command register 26 includes a control CAM portion 66 which comprises an execute bit 68, a sort bit 70 and a reply sort bit 72, each of which has associated therewith a compare/write circuit 74, 76, and 78 and write circuit 73, 75 and 77.

The TDM data bus 22 is connected to a plurality of input/output ports 80 through which information may be received and transmitted. Essentially, the ports comprise a number of sources and destinations which may include a number of PCM serial lines or parallel data buses. Each port could be receiving PCM information in a plurality of timed channels such as 32 channels which are repeated in what are commonly called frames. Thus, each channel of a port could be either a source or destination. The switch controller of the present invention and the switch 10 shown in FIG. 1 are uniquely adapted for use in systems as described in U.S. patent application Ser. No. 682,228, entitled, "Apparatus for Establishing Communication Paths" now U.S. Pat. No. 4,639,910 and U.S. patent application Ser. No. 682,038, entitled, "Communication System" now U.S. Pat. No. 4,638,474 both filed on evendate herewith.

The input/output ports 80 and more particularly the channels thereof form sources and destinations that are connected to the TDM data bus 22 during predetermined time slots (TS), 16 time slots per channel time, in a well known manner as described in the last two mentioned patent applications. The TDM data bus is a parallel bus having 16 lines, one line for each bit of data.

The data bus 22 is connected to a gate 82 which senses the particular coded word used to request a command register. In response to the coded word gate 82 provides a signal called Start of Packet, SOP, to AND gates 84 and 86.

An assign priority logic circuit 88 monitors the assignment of the five command registers 26 to determine which are assigned to command sources. If all five command registers are assigned to command sources, a command register full signal will be provided to gate 84. Thus, when gate 84 receives a clock signal, an SOP signal and a command register full signal, it provides an SOP reject signal to a line 90 indicating that the SOP signal has been rejected. Line 90 is also connected to a read input of the read/write logic 42 associated with the assignment CAM portion 40 so that the address of the source requesting to become a command source is read out on the eight bit bus 46.

The assign priority logic 88 has an output and an input for each of the five command registers 26. The assign priority logic provides a signal to gate 86 of the highest priority usassigned command register 26 so that gate 86 in response to the signal, an SOP signal and a CLK signal will provide a logic level 1 to a word line extending across all of the CAM and RAM cells of the highest priority unassigned command register 26 thereby enabling said cells to be written to or read from. The assign bit 48 stores the status of the command register and provides an output through a buffer 92 to assign priority logic 88 so that the logic remains current.

The operation and response of the command register to command signals will be discussed subsequently. However, control of many of the operations of the command register 26 is provided by the control CAM 66 wherein the sort, execute, and reply sort bits determine which control functions are to be carried out. The control functions themselves have a designated priority such that if a sort function is to be accomplished on two or more command registers 26, the sort function will be performed on the highest priority command register first. Likewise, there is a priority of functions, such that the execute function will have priority over the reply sort function which has priority over the sort function. Thus, a control priority logic circuit 94 is provided as part of the comand processor with inputs from each of the there control CAM bits for each of the command registers through buffers 96. Control priority logic 94 provides five outputs, one to each command register through a AND gate 98. AND gate 98 provides an output to a word line extending to all of the CAMs and RAMs of its command register 26 to thereby enable the CAMs and RAMs within that command register to be read from or written to. The control priority logic 94 performs a dual priority determination. Firstly, establishing priority based on control function and secondly, priority based on the command register priority. Control priority logic 94 has another output providing control function signals to a command timing circuit 97.

The command reject signal provided by reject logic 24 appears on line 100 and, as previously described, functions as a read signal to read/write logic 42 so that the address of the command source of the rejected command may be read to the eight bit bus 46. Line 100 is also connected to a write input to the read/write logic 32 and to a reject code circuit 102. Reject code circuit 102 has an output connected to the TDM data bus 22 and provides a predetermined reject code signal to the data bus upon receipt of the command reject signal on line 100. Simultaneously therewith the write signal to read/write logic 32 causes the data RAM 28 to write the special reject code so that the command register will retain a record that the command was rejected.

The command processor includes a sort PLA 104 connected to the TDM data bus 22 for decoding operation codes (OP CODES) received from command sources and for providing decoded command signals. The sort PLA 104 receives control priority logic output signal and time slot 13 signal. The command signals are provided to the command timing circuit 97 which also receives the control priority logic output signals and is part of the command processor.

A counter 101 receives a clock signal, CLK, from the using system and provides time slot signals, TS, to a timing control logic circuit 99 and the command timing circuit 97.

The timing control logic circuit 99 provides the following timing signals for the control of the switch controller: E COMP, C COMP, C PRG, T DSG, F DSG, C TIME, DRD, DWR, CIRWR, CFWR, ASWR, AS COMP and ASRD. The command timing circuit 97 provides the following timing signals for executing commands; SWR, SRD, SDWR, SDRD, DWR, DRD, EWR, ERD, EDWR, EDRD, EXWR0, EXWR1, RSWR0, RSWR1, STWR0, STWR1, PWR, RRD RDWR, RDRD, ICAWR and write and read signals for switch 10.

In the particular applications mentioned in the previously referenced patent applications, the using system may have an input/output port 80 adapted to interface with a controller such as a microcomputer. Such interfaces are disclosed in U.S. patent application Ser. Nos. 682,035 and 682,034 entitled, "Adaptive Interface for Use With a Microcomputer" and "Interface for Direct Data Transfer" respectively and filed on evendate herewith. Such a controller could be considered an intelligent source for providing commands. Of course, others of the input/output ports 80 could also be intelligent sources capable of providing commands and initiating an SOP. The command reject signal provided on line 100, the SOP reject signal provided on line 90 and the eight bit bus 46 are connected to the controller interface port so that the controller may respond to these signals as may be required by the using system.

The operation of the switch controller starts when a source sends a request to become a command source by writing onto the TDM data bus 22 a word having a unique code. The word is essentially a command which must be processed by the command processor function of the switch controller. Gate responds to the unique word by providing an SOP signal. Assuming there is an unassigned command register, the priority logic in conjunction with the SOP signal will enable the CAM and RAM cells of the highest priority unassigned command register so that the address of the source requesting to become a command source may be written to the assign CAM portion 40. The next time the TDM bus receives data from the command source, the assign CAM portion 40 will recognize the address, thereby enabling the data RAM portion 28 and allowing the data on the TDM bus to be written to the data RAM. Simultaneously, the sort bit will be written to a logic level 1. The sort bit will generate a word line in a subsequent time slot and allow a sort control function to be performed. A sort control function is performed by reading the data in the data RAM to the TDM data bus and simultaneously enabling the sort PLA 104. Sort PLA 104 decodes the OP CODE bits contained in the data RAM to determined which of the possible commands, as for example 64 commands, was issued by the command source. In response to the decoded command signal and timing signals the command timing circuit 97 provides a plurality of write and read control signals. Likewise, the timing control logic circuit 99 provides switch controller timing signals. These various signals are used to control both the controller of the present invention and the switch 10 in accordance with the timing charts to be described subsequently. If the decoded command requires it, an execute function could follow the sort function and after that a reply sort function.

Sort functions move data between portions of a command register. Execute functions transfer data from or to a command register to or from the switch. The reply sort functions read the source or destination CAMs in the switch to the TDM data bus and then write the addresses therefrom to the data RAM of a command register.

Figure 2:
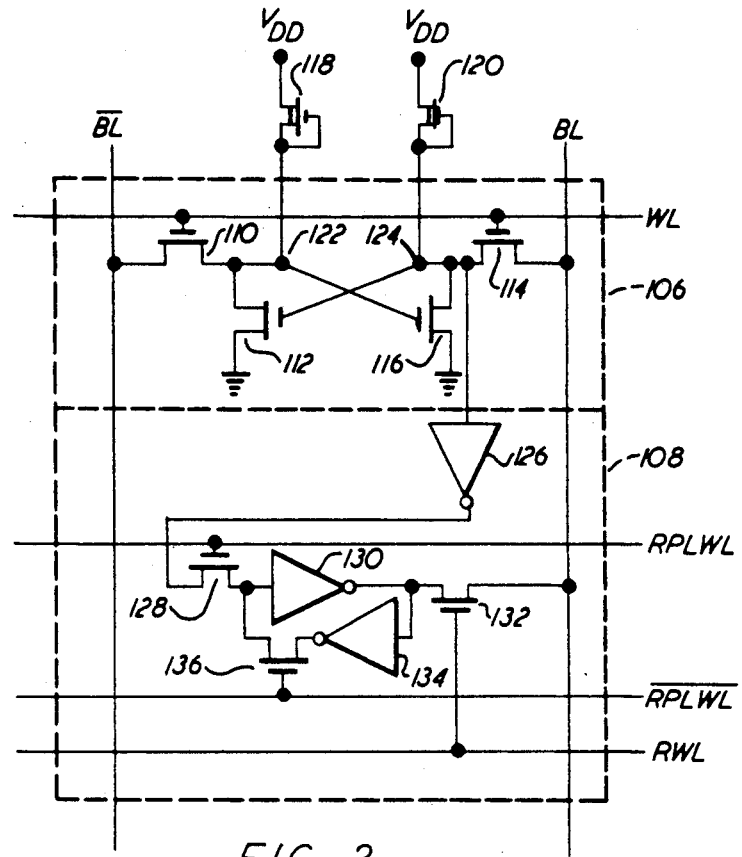
FIG. 2 is a schematic diagram of a RAM cell that may be used for storing one bit of RAM data, the RAM cell is shown in conjunction with a latch which may be used to store data previously stored in the RAM cell.

Referring to FIG. 2, there is shown a schmetic diagram of a RAM cell 106 as used in the data RAM portion 28 and a latch cell 108 as used in the latch portion 30. RAM cell 106 includes a memory portion comprising transistors 110, 112, 114, and 116 interconnected in a standard manner. The RAM cell is a dynamic RAM and therefore will require a refresh means. Accordingly, depletion mode transistors 118 and 120 could be provided and are connected in a standard manner to make the RAM static thereby eliminating the need for a refresh means. Transistors 110 and 114 are connected to a word line WL for the purpose of enabling the RAM cell and connecting it respectively to the bit lines BL and BL. The bit lines extend across all five command registers and connect all of the RAM cells associated with a particular bit of the command registers. The RAM cell functions in the standard manner as described in the previously referenced application entitle "Apparatus and Method for Providing Dynamically Assign Switch Paths". The data stored in the RAM cells are stored in nodes 122 and 124.

The latch cell 108 includes an inverter 126 having an input connected to node 124 of RAM 106. An output of inverter 126 is connected through a transistor 128 to an input of another inverter 130. Inverter 130 has an output connected through a transistor 132 to bit line BL. The output of inverter 130 is also connected to an input of an inverter 134 which has an output connected through a transistor 136 to the input of inverter 130. Transistor 128 is connected to and controlled by a reply latch word line, RPLWL, while transistor 136 is connected to and controlled by an inverted reply latch word line, RPLWL. Transistor 132 is connected to and controlled by a reply word line, RWL.

Figure 3:
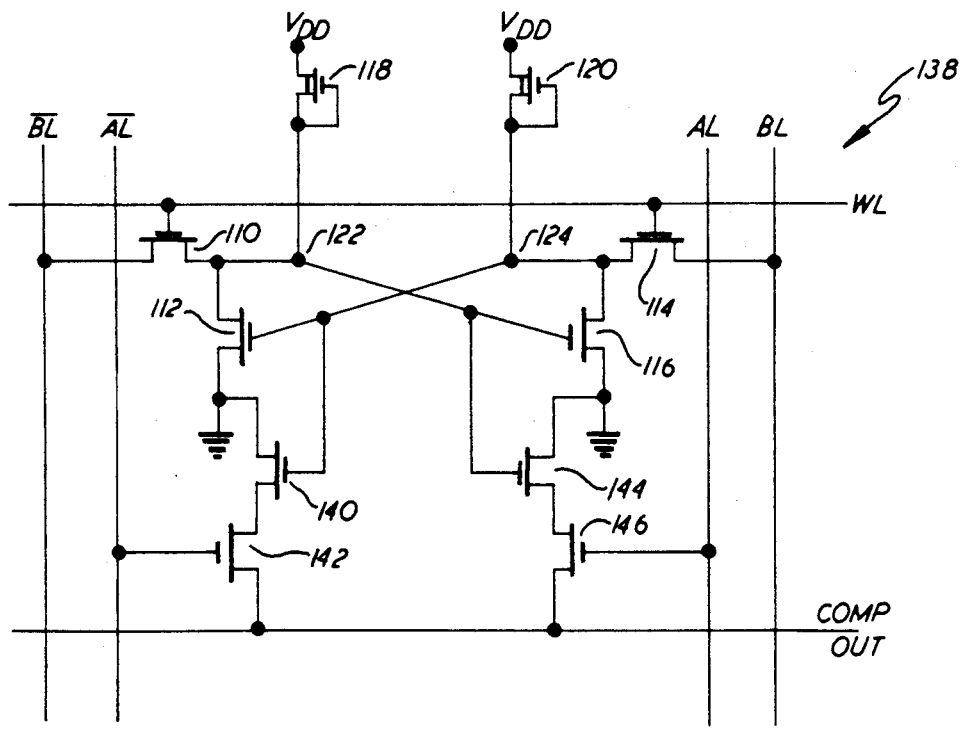
FIG. 3 is a schematic diagram of a CAM cell that may be used for storing and comparing one bit of CAM data.

Referring to FIG. 3, there is shown the circuitry for a standard CAM cell 138 which may be used in the assign CAM portion 40, the reply CAM portion 60, or the control CAM portion 66. The standard CAM cell comprises a RAM memory portion similar to that of cell 106 shown in FIG. 2 and a compare portion. The compare portion comprises serially connected transistors 140 and 142 connected between ground and a compare line, COMP OUT. Transistor 140 is responsive to the signal stored at node 124 while transistor 142 is responsive to a signal on an address line AL. Transistors 144 and 146 are serially connected between ground and the compare line, COMP OUT. Transistor 144 is responsive to the signal contained at node 122 while transistor 146 is responsive to a signal on address line, AL. The CAM cell functions in a manner similar to the CAM cells described in the previously referenced patent application with the exception that the cells in the present invention are provided with pairs of bit lines and address lines. Essentially, the bit lines are for writing to and reading from the RAM memory portion of the cell while the address lines are used when a compare function takes place.

Referring to FIG. 4, there is shown a read/write circuit 148 that may be used to read from or write to a bit line pair associated with RAM cells of the type shown in FIG. 2. A plurality of circuits 148 are used in read/write logic 36, 38, 32, 56 and 58 one circuit for each bit line pair. Circuits 148 may also be used in read/write logic 44 and 64. Read/write circuit 148 includes a terminal 150 for connection to a line of a bus for receiving or lauching data from or to the bus. Terminal 150 is connected to an input of an inverter 152 which has an output connected to bit line BL through a transistor 154. The output of inverter 152 is also connected to an input of another inverter 156 which has an output connected through a transistor 158 to bit line BL. A terminal 160 is adapted to receive a write signal, WR, which is connected to transistors 154 and 158 to allow data from the bus to flow to the bit lines BL and BL. Prior to initiating a write operation the bit lines are conditioned by a precharge through transistors 162 and 164 which are responsive to a precharge signal, PRG, provided on a terminal 166. The precharge signal, PRG, on terminal 166 causes transistors 162 and 164 to turn on and thereby provide a $V_{DD}$ signal to the bit lines forcing them to a logic level 1. In order to read the data stored in a RAM cell the read/write circuit 148 includes a transistor 168 connected to bit line BL, said transistor being responsive to a read, RD, signal provided at a terminal 170. Transistor 168 connects the bit line BL to an inverter 172 which has an output connected to terminal 150 for providing read out data thereto. Read/write circuit 148 operates in a manner identical to that of the read/write circuits in the previously referenced application.

Referring to FIG. 5, there is shown a schmetic diagram of a read/write circuit 174 that may be used in conjunction with CAM cells 138 shown in FIG. 3. Circuits 174 are used in read/write logic 42, and 62 for controlling the CAM cells. A terminal 176 is provided for connection to a line of a bus for writing data to a CAM cell or reading data therefrom. Circuit 174 includes many components similar to those shown in circuit 148 of FIG. 4 which components have been given the same numerical indicia and function in the same way as those of FIG. 4. The additional components shown in FIG. 5 include the address lines AL and AL which are connected respectively to the outputs of inverters 152 and 156 through transistors 178 and 180 respectively. Transistors 178 and 180 are responsive to a compare signal, COMP, provided at a terminal 182 for initiating a compare operation. A transistor 184 is connected between address line AL and ground while a transistor 186 is connected between address line AL and ground. Transistors 184 and 186 is controlled by a discharge signal, DSG provided on a terminal 188. The operation of the read/write circuit 174 is described in the previously referenced patent application. The only difference in the circuit 174 shown in FIG. 5 is that function is accomplished using address lines AL and AL while reading and writing are accomplished using bit lines BL and BL as oppsed to the circuit described in the previously referenced application wherein reading, writing and comparing are all done on the bit lines.

Referring to FIG. 6 there is shown the structure and format of the words used in the present invention. As previously mentioned, the TDM data bus is a parallel bus comprising 16 lines. Thus, each data word comprises 16 bits identified in FIG. 6 as bits 0–F. Bits 0–7 are considered the lower byte of the word and contain address information or instructions as indicated by the letters d. The upper byte of the word containing bits 8-F include protocol bits E and F and operation code bites 8-D identified by the letter i. As previously mentioned, the start of packet word, SOP, may only be sent from an intelligent terminal that may become a command source. The start of packet word will contain 16 bits with one of the protocol bits, normally bit E containing a logic level 1. The address bits 0–7 are normally provided to the assign CAM portion 40, the source RAM portion 34, the destination RAM portion 54, and the reply CAM portion 60, each of which have the ability to store 8 bits of address information. The data RAM portion 28 has the ability to store the entire 16 bit word. The sort PLA 104 is designed to decode bits 8 through D which are the operational code bits.

Figure 7A:
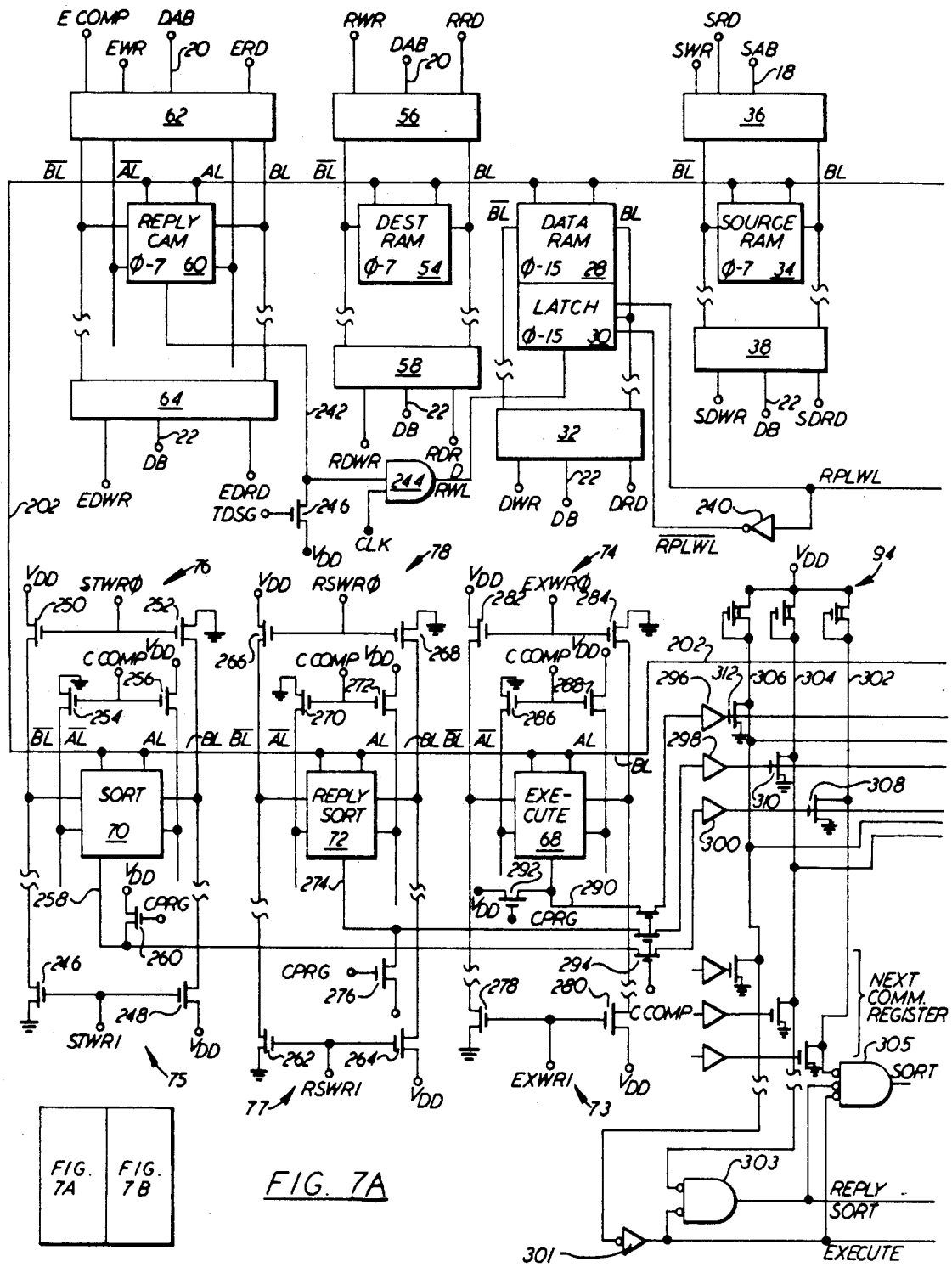
FIGS. 7A and 7B are detailed schematic diagrams of the present invention shown in its preferred embodiment.
Figure 7B:
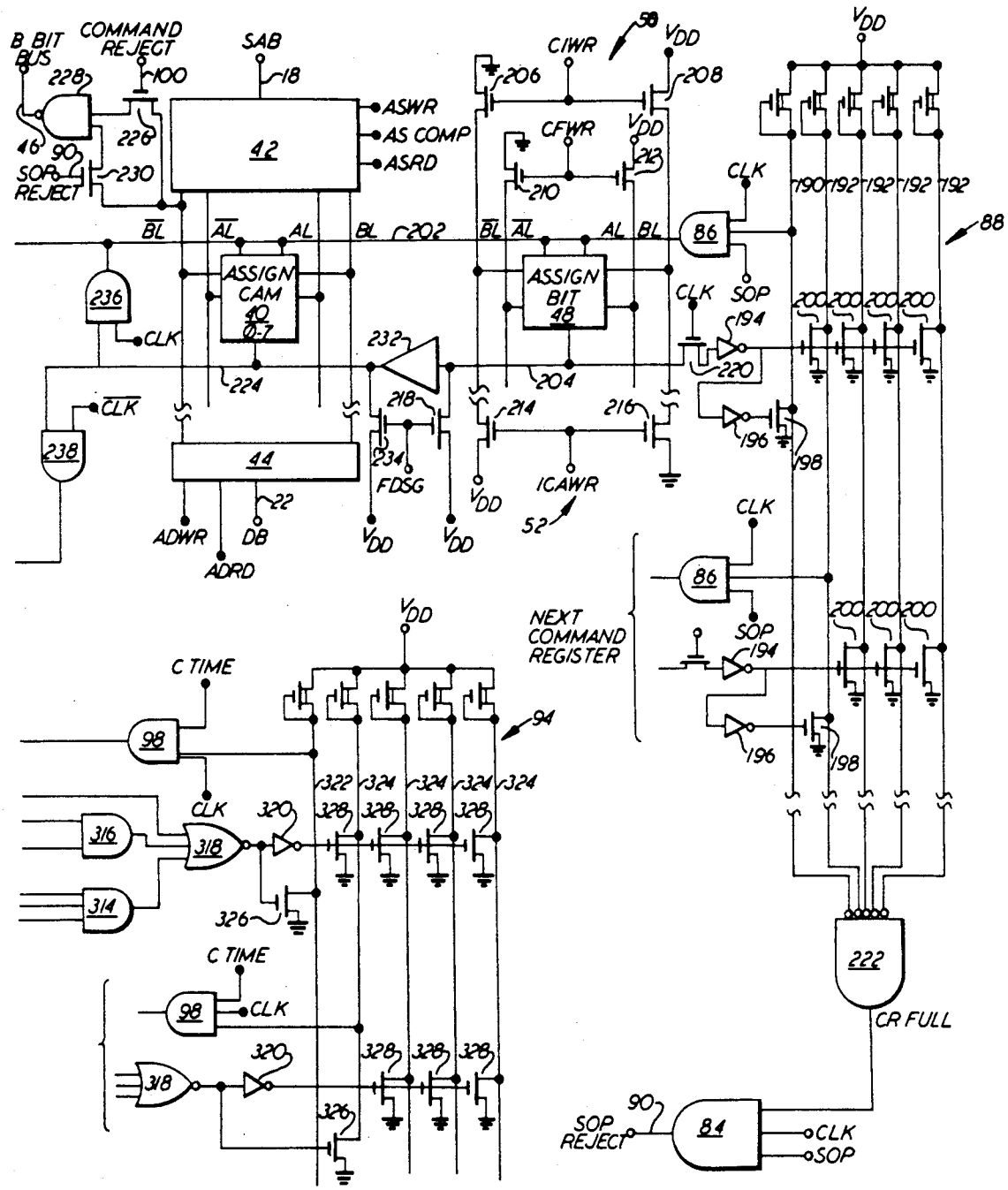

Referring to FIG. 7 there is shown a detailed schematic diagram of a command register 26. The assign priority logic 88 is an array of five rows and columns one row and column being associated with each of the five command registers. Five columns are shown but only two rows. Column 190 represents the highest priority command register and is connected to an input of the AND gate 86 which also receives a clock signal, CLK, and the start of packet signal, SOP. The remaining columns 192 are connected to lower priority command registers as illustrated by the portion of the drawing identified as next command register. The rows associated with each command register comprise a plurality of transistors connected between the columns and ground and controlled by outputs from inverters 194 and 196. For the first or highest priority command register the transistor 198 is connected to column 190 and is controlled by an output from inverter 196, transistors 200 are connected to the remaining columns 192 and are controlled by the output of inverter 194. The columns are connected to $V_{DD}$ through depletion mode transistors that function to charge the columns to a logic level 1.

The output of AND gate 86 is connected to a word line 202 that extends across all CAMS and RAMS of the command register. Assign bit 48 is a CAM cell constructed in accordance with the schematic shown in FIG. 3 wherein the word line WL is line 202 and the compare output COMP OUT is connected to a compare line 204. The address lines and bit lines of the assign bit 48 are connected to a read/write circuit 50. Circuit 50 comprises transistors 206 and 208 which are used to write a logic level 1 to the assign bit of any command register that is enabled by having a logic level 1 on its word line 202. Transistors 206 and 208 are responsive to a signal CIWR for writing the logic level 1 to the assign bit. Transistors 210 and 212 are connected to the address lines for initiating a compare operation with a logic level 1; in response to a CFWR signal. Read/write circuit 52 comprises transistors 214 and 216 which are responsive to a signal ICAWR for writing a logic level 0 to all enabled assign bits which is also used to unassign a command register.

Prior to initiating a compare operation the compare line 204 must be precharged to a logic level 1 and this is accomplished by transtor 218 which is responsive to a signal FDSG. The compare line 204 is connected to the input of inverter 194 through transistor 220 which is responsive to clock signal, CLK, for connecting the compare line to inverter 194.

When a source seeks to become a command source and have a command register 26 assigned to it the source generates the unique coded signal which is decoded by gate 82, shown in FIG. 1, which in turn provides the start of packet signal, SOP. The first step in assigning a command register to a source is to do a compare operation on all of the assign bits of the five command registers by comparing the stored bit against a logic level 1. For registers that are assigned and have the assign bit written to a logic level 1 the compare line 204 will remain at a logic level 1 while for those registers that are unassigned the compare line 204 will drop to a logic level 0. Transistor 220 in response to a clock signal will connect compare line 204 to inverter 194. Prior to receiving the clock signal all of the columns 190 and 192 will be driven to a logic level 1 due to the depletion mode transistors which are connected to $V_{DD}$ if transistors 198 and 200 are off. If the first command register shown in FIG. 7 should compare and provide a logic level 1 signal at the compare line 204 transistor 198 will be turned on causing column 190 to drop to a logic level 0 while the other transistors 200 for that row will remain off. If the next command register were not assigned the transistor 198 for that register would remain off while the transistors 200 would turn on driving those columns, to logic level 0. Thus, only the column for the highest priority command register that is unassigned will remain at a logic level 1.

Assuming that the assign bit for the first command register is at a logic level 0 indicating that it is not assigned, column 190 would remain at logic level 1 while columns 192 would be driven to logic level 0. Subsequent to the compare operation the SOP signal would be provided to AND gate 86 and at the next clock pulse word line 202 would be provided with a logic level 1 signal thereby enabling all of the CAMS and RAMS of the register. When word line 202 is written to a logic level 1 signal CIWR will be provided to the read/write circuit 50 to write a logic level 1 to assign bit 48 thereby indicating that its command register is now assigned. At the same time that a 1 is written to the assign bit the address of the new command source is written to the assign CAM portion 40 by the read/write logic 42 from the source address bus 18.

Assuming that in the initial compare operation it was discovered that all five command registers 26 were assigned then all five columns of the assigned priority logic 88 would be driven to a logic level 0. The columns of the assign priority logic 88 are connected to a NOR gate 222 which in response to all logic level 0 inputs will provide a logic level 1 output identified as command registers full, CR FULL. The CR FULL signal along with a clock signal and the SOP signal are provided to AND gate 84 which in response thereto provides an SOP reject signal indicating that the start of packet request of the requesting source was rejected.

Assign CAM portion 40 is constructed from CAM cells as shown in FIG. 3 and is connected to word line 202 and to a compare line 224. The bit lines of the RAM cells of assign CAM 40 are connected to read/write logic 42 which contains circuits identical to those shown in FIG. 5. Logic 42 is connected to the source address bus 18. Logic 42 receives signals ASWR, ASRD and ASCOMP. The bit lines are also connected to read/write logic 44 which contains circuits identical to the circuit of FIG. 4 and is connected to the data bus 22. Logic 44 receives read/write signals ADWR and ADRD.

Eight outputs are provided to the 8 bit bus 46 from assign CAM 40. Only one is shown for purposes of simplicity. A transistor 226, which is responsive to the command signal on line 100 is connected between bit line reject BL and an input of a NOR gate 228. NOR gate 228 has another input connected to the bit line BL through a transistor 230 which is responsive to the SOP reject signal on line 90. The output of NOR gate 228 is connected to a line of the 8 bit bus 46.

A buffer 232 is connected between compare lines 204 and 224 for isolating compare line 204 from line 224. A transistor 234 is connected between $V_{DD}$ and compare line 224 and is responsive to signal FDSG for precharging compare line 224.

Thus, the assign CAM 40 stores 8 bit addresses which may be written from or read to the data bus 22 through read/write logic 44. In addition the assign CAM may store addresses that are written from or read to the source address bus through read/write logic 42. A compare operation on the assign CAM 40 is accomplished through read/write logic 42 and the comparison is made through the address lines in response to AS-COMP.

An AND gate 236 is connected between compare line 224 and word line 202 with an input being connected to the compare line and an output connected to the word line. In addition, AND gate 236 has an input connected to clock, CLK. AND gate 236 functions to provide a logic level 1 signal to the word line 202 when a compare operation is done in the assign CAM 40 and a comparison is found providing a logic level 1 signal on the compare line 224. Compare line 224 is also connected to an input of an AND gate 238 which has another input connected to an inverted clock signal, CLK. The output of AND gate 238 provides a signal RPLWL which is provided to an input of an inverter 240 which provides an output RPLWL.

Source RAM 34 contains eight RAM cells constructed as shown in the memory portion 106 of FIG. 2. The bit lines for the RAM cells extend to read/write logic 36 containing circuits as shown in FIG. 4. Logic 36 is connected to the source address bus 18 and also receives read/write signals SRD and SWR. The bit lines of each source RAM cell also extend across the corresponding RAM cells of each command register to a read/write logic 38. Logic 38 contains circuits as shown in FIG. 4 and is connected to the data bus 22 and receives read/write signals SDRD and SDWR. The source RAM merely functions to store 8 bit addresses which may be written from or read to either the source address bus 18 or the data bus 22. The cells of the source RAM portion 34 are connected to word line 202 and are enabled thereby.

The data RAM portion 28 and latch portion 30 contain 16 data RAM and latch cells as shown in FIG. 2 with the RAM cells being connected to word line 202 and the bit lines extending to read/write logic 32 which includes circuits constructed as shown in FIG. 4. Read/write logic 32 is connected to data bus 22 and receives control signals DWR and DRD. The cells of the latch portion 30 are connected to receive the RPLWL signal, the RPLWL signal and a RWL signal the derivation of which will be described subsequently.

The read/write logic 32 allows the data RAM portion 28 to write from or read to the data bus. The latch portion 30 allows a bit that is stored in the memory cell portion 106 to be stored in the latch portion 108 upon receipt of a RPLWL signal and a RPLWL signal which is provided in response a compare signal on compare line 224. The data stored in the latch portion 30 may be read out to bit line BL when RWL is at a logic level 1 thereby allowing signals to be read to the data bus from both the data RAM 28 and the latch portion 30 when appropriate commands are provided.

The destination RAM portion 54 includes eight RAM cells for each command register, each RAM cell being constructed as the memory cell portion 106 of FIG. 2. The memory cells 106 are connected to word line 202 and to pairs of bit lines that are connected to read/write logic 56 and 58 which include circuits constructed as shown in FIG. 4. Read/write logic 56 is connected to the destination address bus 20 and receives control signal RWR and RRD whereas read/write logic 58 is connected to the data bus 22 and receives control signals RDWR and RDRD.

Reply CAM 60 includes for each command register eight CAM cells constructed as shown in FIG. 3 each of which are connected to a word line 202 and are connected to pairs of bit lines and address lines. The pairs of bit lines and address lines are connected to a read/write logic 62 having circuits constructed in accordance with FIG. 5 connected to the destination address bus 20 and receiving control signals EWR, ERD and ECOMP. The pairs of bit lines are also connected to a read/write logic 64 having circuits constructed in accordance with FIG. 4 connected to data bus 22 and receiving control signals EDWR and EDRD. The compare output COMP OUT lines of the CAM cells are connected to a compare line 242 which is connected to an input of an AND gate 244. AND gate 244 has another input connected to clock signal, CLK, and provides at its output the RWL signal. A transistor 246 is connected between the compare line 242 and $V_{DD}$ and is responsive to signal TDSG for precharging the compare line 242.

Thus, when a compare operation is performed in the reply CAM 60 between the address lines and the stored data the resulting compare signal is provided to gate 244 which provides the RWL signal to the latch portion 30 thereby allowing the data in the latch to be read to the data bus 22. Addresses may be written to and read from the reply CAM portion 60 through read/write logic 62 and 64.

The execute bit 68, reply sort bit 72 and sort bit 70 are formed of CAM cells with one of each provided in each command register 26. Each bit is connected to the word line 202 and is enabled thereby when the word line is at a logic level 1. The sort CAM has a pair of bit lines connected at one end to a write circuit 75 and at the other end to a compare/write circuit 76. Write circuit 75 comprises transistors 246 and 248 connected respectively to ground and $V_{DD}$ and responsive to a signal STWR1 for writing a logic level 1 to the sort CAM 70. The compare/write circuit 76 comprises transistors 250 and 252 connecting the bit lines BL and BL respectively to $V_{DD}$ and ground. Transistors 250 and 252 are responsive to a signal STWR0 to write the sort CAM 70 to a logic level 0. Compare/write circuit 76 also includes transistors 254 and 256 which connect the address lines AL and AL to ground and $V_{DD}$ respectively and are responsive to a signal C COMP which causes the sort CAM to perform a compare operation with a logic level 1 signal. Sort CAM 70 has a compare output line 258 which is precharged by a transistor 260 which is responsive to signal C PRG. Compare output line 258 provides a C COMP OUT signal.

The reply sort CAM 72 has its pair of bit lines and address lines connected to a compare/write circuit 78. The bit lines of the reply sort CAM cells 72 are connected to write circuit 77 which comprises transistors 262 and 264 for connecting the bit lines BL and BL to ground and $V_{DD}$ respectively, said transistors being responsive to a signal RSWR1 for writing the reply sort CAM cells to a logic level 1. The bit lines are also connected to transistors 266 and 268 in compare/write circuit 78 for connecting the bit lines BL and BL to $V_{DD}$ and ground respectively, said transistors being responsive to a signal RSWR0 for writing the reply sort CAMs to a logic level 0. The address lines AL and AL are connected respectively to transistors 270 and 272 for connecting the address lines AL and AL respectively to ground and $V_{DD}$ in response to signal C COMP which initiates a compare operation with a logic level 1. Reply sort CAM 72 has a compare output line 274 which is precharged to a logic level 1 by transistor 276 in response to signal CPRG. Compare output line 274 provides a C COMP OUT signal.

Execute CAM 68 has a pair of bit lines connected to a compare/write circuit 74 at one end and a write circuit 73 at another end. Write circuit 73 comprises transistors 278 and 280 for connecting the bit lines BL and BL respectively to ground and $V_{DD}$. Transistors 278 and 280 are responsive to a signal EXWR1 for writing the execute CAM cells to a logic level 1. The compare/write circuit 74 includes transistors 282 and 284 for connecting bit lines BL and BL to $V_{DD}$ and ground respectively. Transistors 282 and 284 are responsive to a signal EXWR0 for writing the execute CAM cells to a logic level 0. The address lines AL and AL are connected respectively to transistors 286 and 288 which connect the address lines to ground and $V_{DD}$ respectively. Transistors 286 and 288 are responsive to signal C COMP to initiate a compare operation wherein the execute CAM cells are compared with a logic level 1 signal. The execute CAM 68 has a compare output line 290 which is precharged to a logic level 1 signal by a transistor 292 which is responsive to signal CPRG. Compare output line 290 provides a C COMP OUT signal.

Compare output lines 290, 274 and 258 are connected respectively to inputs of buffers 296, 298 and 300 through transistors 294 which are responsive to signal C COMP. Buffers 296, 298 and 300 represent in detail the buffer 96 shown in the block diagram of FIG. 1 and connect the compare output lines to the control priority logic 94.

As previously mentioned, the control priority logic 94 first establishes priority by control function and thereafter by command register priority. The control function priority is established by three columns: 302 assigned to the sort control function, 304 assigned to the reply sort control function and 306 assigned to the execute control function. The columns extend across all five command registers and are maintained at a logic level 1 through the use of $V_{DD}$ and depletion mode transistors when transistors 326 and 328 are off. Transistors 308, 310 and 312 are connected to columns 302, 304, 306 respectively and function to drive the columns to a logic level 0 by connection to ground in response to a logic level 1 compare output signal, C COMP OUT on compare output lines 258, 274 and 290 respectively. Thus, the columns will be driven to a logic level 0 if their respective command CAMs provide a compare output at logic level 1.

The columns are connected at one end to control function logic circuitry comprising an inverter 301, a NOR gate 303 and a NOR gate 305. Column 306 assigned to the execute function is connected to inverter 301 which provides an EXECUTE output at a logic level 1 when any execute CAM 68 provides a compare output. NOR gate 303 has inputs connected to column 304 and the output of inverter 301 and provides a REPLY SORT output at a logic level 1 only when a reply sort CAM compares and the execute command output is at a logic level 0. NOR gate 305 has three inputs namely column 302, the output of inverter 301 and the output of NOR gate 303 and provides a logic level 1 output as a SORT output when a sort CAM compares and reply sort output and execute output are both at a logic level 0.

An AND gate 314 has inputs connected to buffer 300 and the columns 304 and 306 and provides an output to an input of a NOR gate 318. An AND gate 316 has inputs connected to buffer 298 and column 306 and has an output connected to an input of NOR gate 318. NOR gate 318 has an additional input connected to the buffer 296. NOR gate 318 has an output connected to inverter 320. The command register priority portion of the control priority logic 94 comprises an array of five columns and five rows corresponding to the number of command registers 26. The array comprises a plurality of columns 322 and 324, column 322 corresponding to the highest priority command register and the columns 324 to the lower priority command registers. Using $V_{DD}$ and depletion mode transistors at one end of each column, the columns are maintained at a logic level 1 when they are not driven to a logic level 0 by transistors used in the array. The rows are associated with the command registers and each row comprises a transistor 326 which is connected to a column associated with the command register of the row while transistors 328 are connected to the columns associated with the lower priority command registers. Transistor 326 is responsive to a logic level 1 signal from the NOR gate 318 to drive the column associated with its command register to a logic level 0 while the transistors 328 are controlled by the output of inverter 320 and are responsive to a logic level 1 therefrom to drive the columns associated with all lower priority command registers to logic level 0. Thus, for control purposes the highest priority command register having a logic level 1 signal at the output of inverter 320 will have its column at a logic level 1.

AND gate 98 has an input connected to the column associated with its control register and additional inputs connected to receive a C TIME signal and a clock signal, CLK. The output of gate 98 is connected to word line 202. Thus, if the column associated with any command register is at a logic level 1 during both C TIME and CLK, gate 98 will provide a logic level 1 signal to word line 202 thereby enabling the CAMs and RAMs of the command register.

Figure 8:
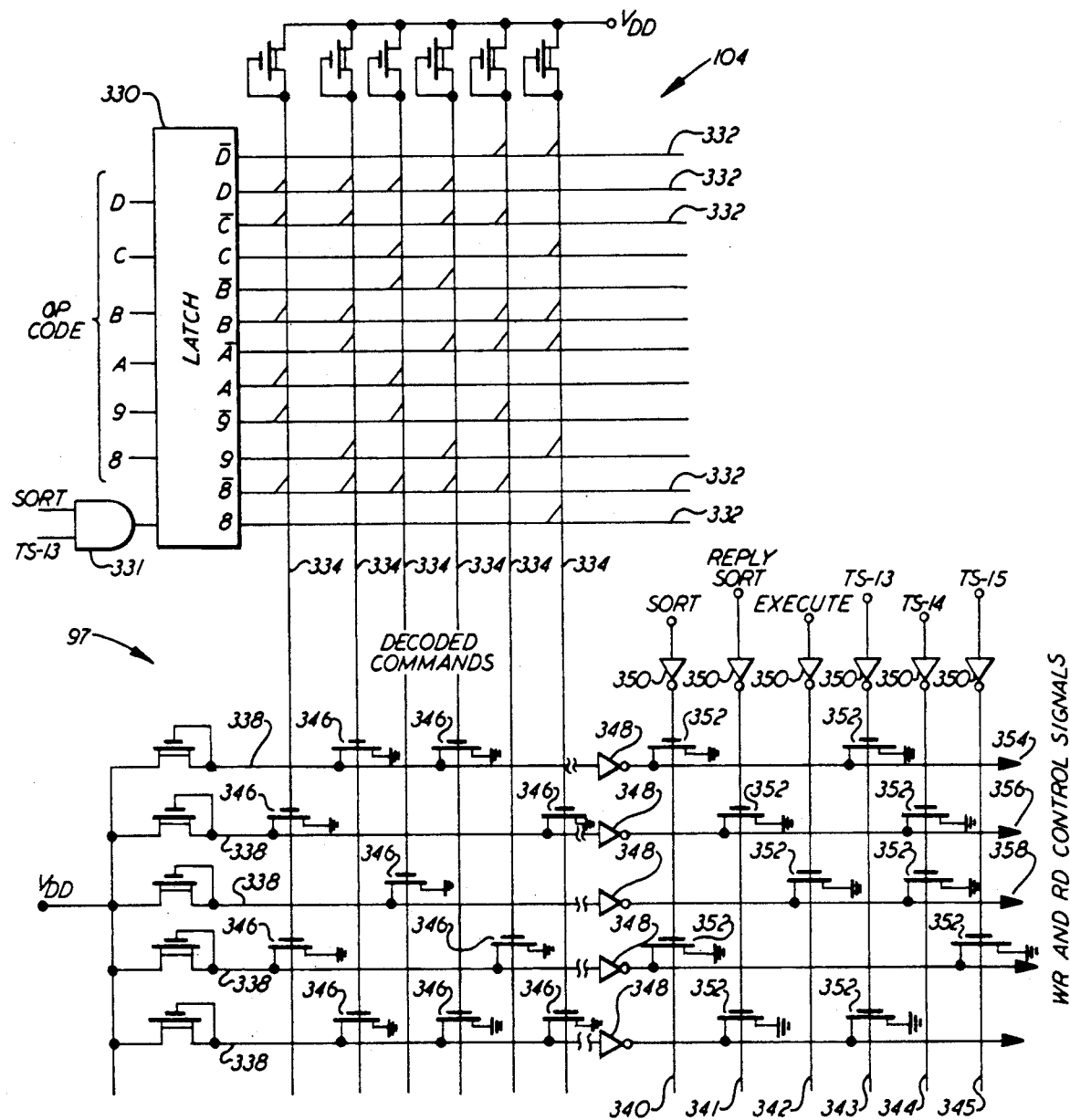
FIG. 8 is a schematic diagram of the sort PLA decode logic and command timing used in the present invention.

Referring to FIG. 8 there is shown a sample of the circuitry that may be included in the sort PLA 104 and the command timing circuit 97.

As previously mentioned, the sort PLA 104 is connected to the data bus 22 for receiving bits 8 through D of the data word which bits include the operational code designating the command that is being issued to the switch controller. Sort PLA includes a latch circuit 330 having a gate 331 for receiving the SORT signal and a time slot 13 signal. The bits are clocked into a latch circuit 330 at time slot 13 if a sort is being done and are stored therein. Each of the operation code bits appear at an output of the latch 330 as the bit and an inverted bit. Thus, latch 330 provides 12 output lines 332. Lines 332 are intercepted by a plurality of columns 334 to form a matrix. The number of columns 334 corresponds to the number of commands that may be executed by the switch controller. The columns are maintained at a logic level 1 by $V_{DD}$ and the depletion mode transistors formed at one end of the columns when the columns are not driven to logic level 0 by transistors in the matrix. Transistors indicated by a diagonal line are disposed throughout the matrix at selected intersections of rows and columns for the purpose of decoding the coded operational commands provided by bits 8 through D. Thus, for each command presented to the sort PLA only one column 334 will remain at a logic level 1 to thereby identify the particular command that is to be executed.

The columns 334 extend across another set of rows 338 and form another matrix therewith. Rows 338 each correspond to a read or write signal used in the Switch Controller and Switch to execute a command. Six additional columns, 340, 341, 342, 343, 344 and 345 are provided. Columns 340, 341 and 342 are connected respectively to function outputs SORT, REPLY SORT and EXECUTE of FIG. 7 which are driven to a logic level 1 if a compare output C COMP OUT is provided on their associated CAM cells. Columns 343, 344 and 345 are connected to time slot signals TS13, TS14 and TS15 respectively. The rows 338 are charged to a logic level 1 by $V_{DD}$ and the depletion mode transistors connected thereto when transistors 346 are off. Transistors 346 are disposed throughout the matrix so that selected rows 338 will be driven down to a logic level 0 depending upon which command is decoded. An inverter 348 is disposed in each row 338 to convert the logic level 0 to logic level 1 in the selected rows. Columns 340 to 345 intercept the rows to form another matrix for controlling the timing for the various read and write signals required for execution of the decoded commands. Inverters 350 are disposed between inputs of the columns 340 to 345 and the matrix. Transistors 352 are disposed at intersections of the matrix to determine the timing of each read and write signal. As for example, an output 354 will provide a logic level 1 signal during time slot 13 when a sort function is being performed. Output 356 will provide a logic level 1 signal during time slot 14 when a reply sort function is being performed. In like manner, output 358 will provide a logic level 1 signal during time slot 14 when an execute function is being performed. Thus, the various outputs of command timing circuit 97 provide all of the read and write control signals previously mentioned during the proper time slots when designated control functions are being performed.

In the previously referred to application entitled "Apparatus and Method for Providing Dynamically Assigned Switch Paths" it is shown how the switch 10 may be operated in cycles of 16 time slots, TS, numbered 0 to 15. The present invention is also operated in cycles of 16 time slots which are controlled by counter 101 which receives a clock signal, CLK, from the using system. The 16 time slots fill a single channel time and there are 32 channels per frame as previously discussed.

Referring to FIG. 9 there is shown the relative timing of various signals used for controlling the switch controller. The timing arrangement as shown in FIG. 9 allows for connection to five sources S1 to S5 and six destinations, D1 to D6 which sources and destinations may be physical input/output ports such as ports 80 shown in FIG. 1 or may be ports and channels as in a PCM link. During a channel time of 16 time slots as shown in FIG. 9, the TDM data bus is accessed to the sources and destinations during time slots 2 through 12 during which the input/output ports 80 are strobed by the TS signal to cause the port to launch or receive data to or from the data bus. It is during one of the time slots when a source accesses the data bus that the unique coded word requesting that a source become a command source is presented to the gate 82 which in response thereto provides the SOP signal shown as being cross-hatched in FIG. 9 indicating that it may or may not be present depended upon whether the unique code is recognized in one of the source time slots.

Prior to a source being connected to the TDM data bus the assign bit is compared with a logic level 1 signal which comparison is initiated by a CFWR signal. This compare operation will update the assign priority logic circuit and may result in the generation of a CR FULL signal. The CR FULL signal is shown cross-hatched in FIG. 9 indicating that the signal may or may not be at a logic level 1 depending upon whether or not all the command registers are assigned. If the CR FULL signal goes to a logic level 1 the subsequent SOP signal and a clock signal, CLK, in time slot 3 will result in an SOP REJECT signal.

One time slot prior to a source being connected to the TDM data bus the source address is provided by the source address bus and will appear at the read/write logic 42. An ASWR signal appears at the same time as the possible SOP REJECT signal and therefore writes the source address from the source address bus to the bit lines of the assign CAM 40. The signals on the bit lines are then read to the 8 bit bus as a result of the SOP REJECT signal on transistor 230.

If the command registers are not all assigned and no SOP REJECT signal is generated, the SOP and the clock signal will occur simultaneously generating a logic level 1 word line signal, WL, on word line 202 of the highest priority unassigned command register. This word line will enable all of the CAMS and RAMS for the particular control register. Simultaneously with the word line signal, WL, and ASWR signal is provided along with a CIWR signal. These signals cause the assign CAM 40 to write the address from the source address bus indicating the source to which the command register is being assigned. The CIWR signal causes a logic level 1 to be written to the assign bit 48 thereby indicating assignment of the command register to a source. The above describes the timing of the signals necessary to assign a command register to a particular source and to write the source address to the assign CAM 40.

Assuming for example that a command register was assigned to source S1, the address of source S1 would be written to the assign CAM 40. During the next frame the source address bus presents source addresses to read/write logic 42. During time slots 2 and 3 source address S1 will be presented and during the second half of time slot 2 and ASCOMP signal is provided to read/write logic 42 which initiates a compare operation in the assign CAM 40. Since the source address S1 was previously written into the assign CAM a logic level 1 compare output will be provided on line 224 which will result in the generation of a word line signal, WL, on word line 202 through gate 236. Thus all CAM and RAMS in the command register will be enabled. While the CAMS and RAMS are enabled and particularly during the second half of time slot 3 a DWR signal is provided to the read/write logic 32 associated with the data RAM allowing the information on the TDM data bus to be written to the data RAM 28. This data will be operated on in a manner to be described subsequently. It should also be noted that at the same time, namely during the second half of time slot 3 an STWR1 signal is provided thereby writing a logic level 1 to the sort CAM 70 providing an indication that a sort control function should take place to operate on the data stored in the data RAM.

To illustrate the function of the reply latch portion 30 and the reply CAM 60, it should be noted that during the second half of time slot 2 an ASCOMP signal was provided to read/write logic 42 to initiate a compare operation resulting in a logic level 1 being provided at the assign CAM 40 compare output line 224. This logic level 1 in conjunction with a clock signal during time slot 3 resulted in a word line signal, WL, on word line 202. However, prior to the second half of time slot 3, an RPLWL signal will be generated by gate 238 as a result of the compare output line signal 224 and the clock signal, CLK, appearing at gate 238. Thus, the RPLWL and RPLWL signals are presented to latch portion 30 during the first half of time slot 3 just prior to the generation of the word line, WL. The RPLWL and RPLWL signals will allow the data contained in the data RAM portion 28 to be transferred to the latch portion 30 before it is destroyed by writing new data from the data bus which will occur during the second half of time slot 3 when WL is generated. The data stored in latch portion 30 may be read out to a destination by initiating a compare operation on the reply CAM portion 60. A destination address is provided on the destination address bus 20 at the same time that an ECOMP signal is provided to cause the destination address to be compared against the addresses stored in the reply CAM portion 60. If a comparison is found line 242 will be driven to a logic level 1 which is presented to an input of gate 244. When the clock signal in time slot 2 reaches gate 244 the RWL signal is provided causing the data in latch portion 30 to be read to the data RAM bit line BL. Simultaneous with the generation of the RWL signal, a DRD signal is presented to the read/write logic 32 causing the signal on data RAM bit line BL to be provided to the data bus 22.

The commands written into the data RAM and particularly the operation code, OP CODE, bits 8 through D are performed during time slots 13 through 15 of the various succeeding channels. In FIG. 9 it should be noted that a signal C TIME is generated during time slots 13 through 15 and this signal is provided to gate 98 to allow the generation of a word line for the highest priority command register having the highest priority function to be performed. During the first half of time slot 13 a CPRG signal is provided for precharging the compare output lines of the three control CAMS, namely the execute CAM, the reply sort CAM, and the sort CAM. After precharging, a C COMP signal is provided during the second half of time slot 13 to each of the control CAMS to perform a compare operation with a logic level 1 signal to determine which CAMS have been written to a logic level 1. The compare output lines will generate a C COMP OUT signal at logic level 1 if the associated CAM was written to a logic level 1. As a result of this compare operation, the control priority logic 94 will provide a SORT, REPLY SORT or EXECUTE function output for the highest priority function for which a control CAM had been written to logic level 1 for any of the five command registers. Gates 98 will provide a logic level 1 output to the word line 202 of the highest priority command register that is awaiting the highest priority control function operation.

Figure 10:
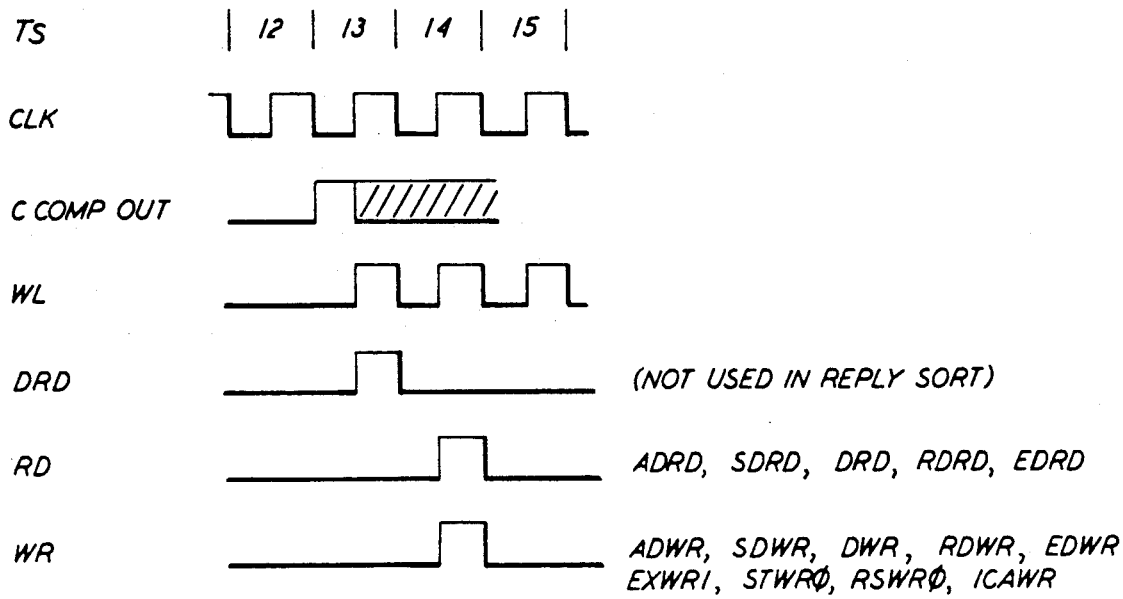

FIG. 10 illustrates the timing for the accomplishment of a sort or a reply sort function. Prior to the compare operation the CPRG signal causes the compare output line to go to a logic level 1 during the first half of time slot 13. During the second half of time slot 13 the compare operation takes place and if a comparison is found the compare output line remains at at logic level 1 whereas if no comparison is found it drops to logic level 0 as indicated by the cross-hatched portion of the C COMP OUT signal in FIG. 10. The C COMP OUT signal is processed through the control priority logic 94 and results in a clocked word line signal WL during the second half of time slots 13 through 15. A DRD signal is provided during the second half of time slot 13 which coincides with the first word line, WL, from gate 98 to thereby read data from the data RAM portion 28 to the TDM data bus. Latch 330 is strobed in time slot 13 to receive the OP CODE bits 8 through D which are processed by the sort PLA and decoded resulting in timed read and write control signals. During the second half of time slot 14 some portion of the command register is read in response to a read signal depending on the command decoded by the sort PLA. The read signals that may be provided at this time are: ADRD, SDRD, DRD, RDRD and EDRD which will result in the reading of data to the data bus from one of the five CAM or RAM storage portions of the command registers. Simultaneously in the second half of time slot 14 one or more write command signals could be provided, depending on the decoded command, to accomplish a write operation to some part of the command register from the data bus and to possibly write 1's or 0's to the control CAMS. The write control signals that could be provided at this time are: ADWR, SDWR, DWR, RDWR, EDWR, EXWR1, STWR0, RSWR0, or ICAWR. In response to these write signals we may write an address to the assign CAM, the source RAM, the data RAM, the destination RAM, or the reply CAM. We could also write a logic level 1 to the execute CAM, indicating the need for an execute function, a logic level 0 to the sort CAM indicating that the sort function has been completed, a logic level 0 to the reply sort CAM indicating a reply sort function has been completed or a logic level 0 to the assign bit to unassign a command register.

Figure 11:
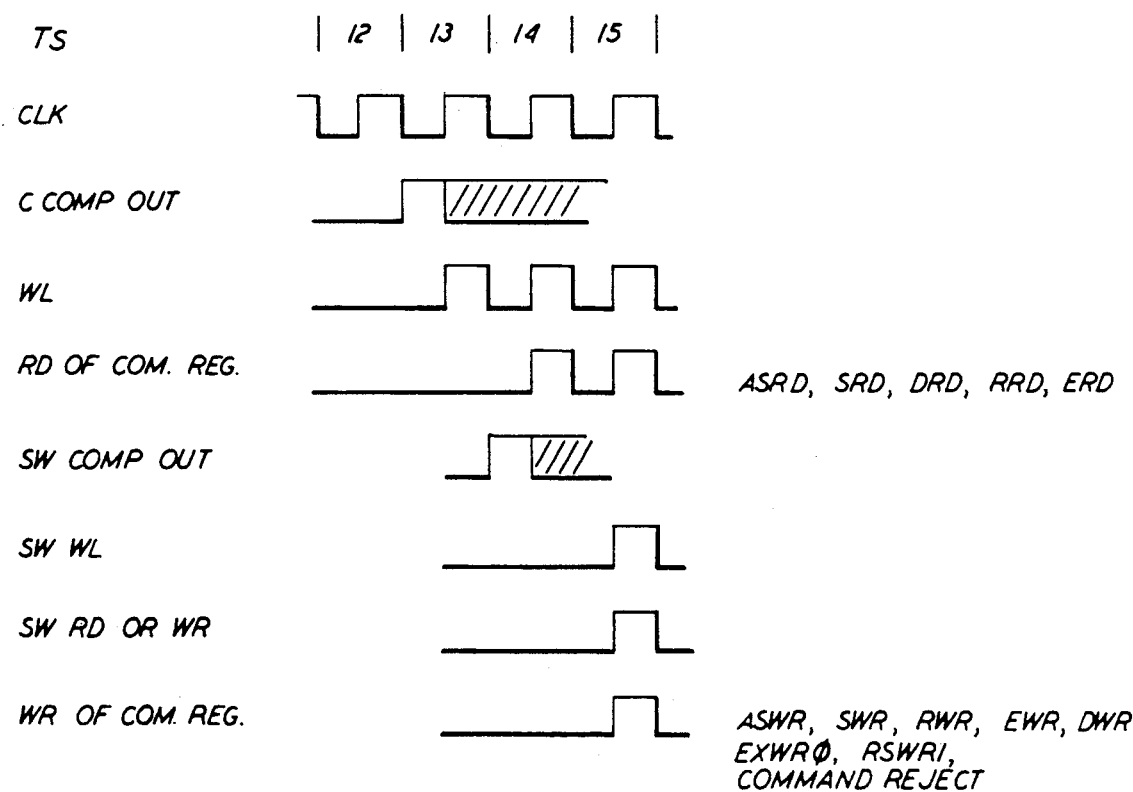

Referring to FIG. 11 there is shown the timing for an execute function which will result if the execute CAM 68 is written to a logic level 1 as may happen during a prior sort function. If a sort function sets the execute CAM to logic level 1 then during the time slots 13 to 15 of the next channel the execute function will be accomplished. The execute function is initiated as is the sort function by doing a precharge of the control CAMS with signal CPRG during the first half of time slot 13. Thereafter, in the second half of time slot 13 a C COMP signal is provided to initiate the compare operation. If an execute CAM is written to logic level 1 the C COMP OUT signal will remain at a logic level 1 as opposed to dropping to a logic level 0 as indicated by the cross-hatched portion starting at the second half of time slot 13. This will result in the generation of a word line signal WL during the second half of each of time slot 13 through 15 for the highest priority command register requiring an execute function. During the second half of time slot 14 a read control signal is provided to one or more portions of the command register to read sections of the command register to either the source address bus, the destination address bus, or the data bus depending on the command that is decoded by the sort PLA during the previous channel time. The read signals that may be provided during the second half of time slot 14 could be ASRD, SRD, DRD, RRD, or ERD. If, during the second half of time slot 14, addresses are being read from the command register to either the source or destination address buses, the switch may perform a compare function in one of its CAM portions as illustrated by the SW COMP OUT signal and if a comparison is found a word line will be generated across the pertinent word of the switch during the second half of time slot 15 thereby enabling the CAMS and RAMS of the switch. Depending upon the decoded command signal from the sort PLA, data or addresses may be read from the command register to the switch or from the switch to the command register during the second half of time slot 15. If data is to be read from the command register to the switch, the command register will receive a read control signal such as ASRD, SRD, DRD, RRD, or ERD during the second half of time slot 15 while the switch will receive a write signal at the pertinent CAMS or RAM. If data is to be read from the switch to the command register the pertinent portions of the switch will receive a read signal in the second half of time slot 15 while the command register will receive any of the following write control signals ASWR, SWR, RWR, EWR, or DWR depending upon which portion of the command register is to be written to. If the address read to the switch during the second half of time slot 14 is not found in the switch during the compare operation, a COMMAND REJECT signal is generated during the second half of time slot 15. If the execute function is complete an EXWR0 signal may be generated to write the execute CAM to logic level 0, and if a reply sort function is required an RSWR1 signal may be provided to the reply sort CAM to write the CAM to a logic level 1.

To summarize, a command operation is first initiated sometime during time slots 3 to 12 of a channel when a particular port and channel source sends a request to become a command source. If a command register is available the highest priority unaassigned command register is assigned to the port and channel source while the port and channel address is written into the assign CAM and the assign bit is written to a logic level 1. During the next frame when the port and channel address appears on the source address bus and a compare operation takes place in the assign CAM, a word line is generated and the 16 bit word appearing on the TDM data bus during the source port and channel address time is written to the data RAM portion 28 and the sort bit 70 is written to a logic level 1. This is all accomplished during time slots 2 through 12. During time slot 13 a compare operation on the control CAMS results in the sort bit generating a C COMP OUT logic level 1 signal during time slots 13 through 15 in any channel when the sort bit is written to logic level 1.

A word line WL will be generated during time slots 13 through 15 for the highest priority command register having the highest priority function waiting to be performed. During susequent channel times in time slots 13 through 15 control functions will be performed in accordance with priority based first on function priority and then command register priority. This will continue until the priority of the sort function and command register is reached then a word line, WL, will be generated in the command register having the sort bit written to 1. The OP CODE data in the data RAM is read from the data RAM to the sort PLA which decodes the command and generates the necessary write and read control signals which will result in the shifting of data within the command register such as by reading from the data RAM and writing simultaneously to the source RAM. When the sort function is completed the sort bit will be written to logic level 0 and if an execute function is required the execute bit will be written to logic level 1.

During the next channel time in time slots 13 through 15 the execute bit will cause a word line to be generated when compared and read and write control signals will be generated for shifting data between the command register and the switch. After the execute function is completed the execute bit will be written to logic level 0 and if a reply sort function is required the reply sort bit will be written to logic level 1.

During the next channel time and during time slots 13 through 15 the reply sort function will be performed during which data is read from one section of the command register, i.e. source or destination RAM and is written to the data RAM for transfer to a destination via latch 30. When the reply sort function is completed the reply sort CAM is written to logic level 0 thereby completing the entire command received by the data RAM.

During the next frame in the first half of the time slot in which a word line would be generated as a result of a comparison by the assign CAM between the source address bus address and a stored address the RPLWL signal is provided which causes the reply latch to load the data that is in the data RAM portion 28 after which the entire process of writing the data on the data bus to the data RAM is repeated and the command functions are executed. After the last required commands to properly establish a switch path are provided by the command source the assign bit is written to logic level 0 thereby unassigning the command register and the port and channel will no longer be considered a command source.

To establish a switch path through switch 10 between a particular port and channel as a source, and a particular port and channel as a destination, a port and channel becomes a command source and has a command register assigned thereto as the result of an SOP. The port and channel address is written into the assign CAM. During the next frame a command word is written into the data RAM and the sort bit is set to logic level 1. The command is decoded which command may require that the lower byte of the data RAM, which would include an 8 bit address, be read to the data bus simultaneously with the source RAM receiving a write control signal to write the address from the data bus thus completing a sort function and writing the execute bit to logic level 1.

During the next channel time, the execute function is accomplished by reading the source RAM to the source address bus and simultaneously writing the address on the source address bus to the source CAM 12 of the switch, the execute bit may also be written to logic level 0. During the next frame the command word is read to the data RAM and the sort bit is written to logic level 1. The sort function may require the lower byte of the data RAM to be read to the data bus and simultaneously written to the destination RAM after which an execute function may be accomplished wherein the source RAM is read to the source address bus while a compare is done by the source CAM 12 to enable the switch word having the source address. The destination RAM word is read to the destination address bus and is written to the destination CAM 16 of the swtich thereby completing a path through the switch.

If it is desired to have a particular destination check the commands that have been executed an echo path may be established using the reply CAM 60. In order to establish an echo path a command word is written to the data RAM. The command word would contain an OP CODE command to establish an echo path and the destination address of the echo path. During a sort function the destination address would be written to the reply CAM. In subsequent frames when the destination address appears on the destination address bus the reply CAM will compare and a RWL signal will be generated which will cause the latch portion 30 to read to the TDM data bus the command word that was stored in the data RAM during the previous frame. At the same time that the latch portion 30 reads to the TDM data bus the TDM data bus will read to the addressed destination. Thus, the destination can check the command that was executed. In the event that a COMMAND REJECT had taken place the reject code would be read out to the destination.

From the above it is clear that many different types of commands could be provided for shifting addresses in various ways to establish and breakdown paths in the switch 10. A reply or echo path may be established to ascertain whether a command was properly executed. Many different functions may be accomplished with the switch controller which has considerable flexibility so that the full benefit of a dynamic switch may be realized.

While the invention has been described as a switch controller, it should be apparent to one skilled in the art that it may be used as a command processor used to execute commands and direct instructions to locations designated by the commands. The addresses that are shifted around by the present invention are in a true sense instructions. Thus, the invention may be used to direct instructions to remote destinations.

Thus, the scope of the invention should only be limited by the claims appended hereto and not by the above description of a particular embodiment.

What is claimed is:

1. An apparatus for controlling a communication switch of the type having a plurality of ports for receiving and transmitting information in channels, each of said channels having a distinct address, a data bus connecting said ports to a switch means for establishing connections between channels whose addresses are stored in the switch means, commands for establishing or breaking down connections between channels are provided on any channel, said commands being provided in a series of separate command words said series including a first command word requesting that the channel become a command source and subsequent command words each including a coded command portion and an address portion, said control apparatus comprising:

a command register including a data RAM, on assign CAM, a source RAM and a destination RAM each being connected to the data bus;

means connected to said data bus, responsive to a first command word received from any channel requesting that the channel become a command source, for assigning the command register to said channel, for writing the channel address to the assign CAM and for writing the first command word to the data RAM;

first means for sequentially generating channel addresses;

source address bus means interconnecting said assign CAM, said source RAM, said switch means and said channel address generating means, said channel addresses being generated in timed relation to said channel being accessed to the data bus, said assign CAM comparing the stored channel address with the address received from the source address bus and in response to a comparison, enabling the data RAM to write the next command word from the channel having its address stored;

means for decoding said coded command portion of the command word stored in the data RAM, said decoding means generating control signals in response to said decoded command portion, selected ones of said control signals being provided to said switch means; and means, responsive to said control signals, for executing the decoded command portion by transferring said address portion of the command word from said data RAM in said command register to said switch means whereby said address portion is stored in the switch means as an address of a channel to be connected by said switch means to another addressed channel.

2. An apparatus as described in claim 1, wherein said means for executing includes means for transferring addresses within the control register.

3. An apparatus as described in claim 1, additionally comprising:

a plurality of command registers each assigned a priority; and means for assigning the highest priority available command register to a channel seeking to become a command source.

4. An apparatus as described in claim 3, wherein the means for decoding includes means for sequentially decoding command words in said command registers in order of priority of the command register in which the word is stored.

5. An apparatus as described in claim 4, additionally comprising means for inhibiting the decoding means from decoding a new command portion until the previously decoded command portion is fully executed.

6. An apparatus as described in claim 1, wherein said coded command portion may require execution of a number of different types of control functions in an order determined by the command portion, said decoding means additionally including means for generating said control signals in the order in which the control functions are to be executed.

7. An apparatus as described in claim 6, additionally comprising means for inhibiting the decoding means from decoding a new command portion until the previously decoded command portion is fully executed.

8. An apparatus as described in claim 6, wherein the means for generating said control signals in the order in which the control functions are to be executed includes a CAM for each type of control function and logic circuitry for gating said control signals for the function type to be executed.

9. An apparatus as described in claim 1, additionally comprising:

a reply CAM included in said command register, said reply CAM being adapted to store a channel address to which a previously executed command word is to be sent;

second means for sequentially destination channel addresses;

destination address bus means interconnecting said reply CAM, said destination RAM, said switch means and said second channel address generating means, said destination channel addresses being generated in timed relation to said channel being accessed to the data bus;

latch means associated with the data RAM for storing data contained in the data RAM;

means, responsive to an output from said assign CAM indicating that a new command word is to be received, for reading the command word in the data RAM to the latch means so that the latch means stores the previously executed command word, said reply CAM being responsive to a comparison between an address generated by the second address generating means and a stored channel address for providing an output to the latch means, whereby the latch means reads the command word stored therein to the TDM data bus which reads the command word to the channel address stored in the reply CAM.

* * * * *

UNITED STATES PATENT AND TRADEMARK OFFICE
CERTIFICATE OF CORRECTION

PATENT NO. : 5,031,094

DATED : July 9, 1991

INVENTOR(S) : H. J. Toegel et al

It is certified that error appears in the above-identified patent and that said Letters Patent is hereby corrected as shown below:

Column 24, line 38, after the word "sequentially", insert the word

--generating--.

Signed and Sealed this

First Day of December, 1992

Attest:

DOUGLAS B. COMER

*Attesting Officer*  *Acting Commissioner of Patents and Trademarks*